United States Patent
Elsarelli (10) Patent No.: US 11,613,213 B2
(45) Date of Patent: Mar. 28, 2023

(54) CABLE DRIVEN SLIDING CENTER CONSOLE

(71) Applicant: Brose Fahrzeugteile GmbH & Co. Kommanditgesellschaft, Coburg, Coburg (DE)

(72) Inventor: James Elsarelli, Leonard, MI (US)

(73) Assignee: Brose Fahrzeugteile GmbH & Co. Kommanditgesellschaft, Coburg

( * ) Notice: Subject to any disclaimer, the term of this patent is extended or adjusted under 35 U.S.C. 154(b) by 716 days.

(21) Appl. No.: 16/656,264

(22) Filed: Oct. 17, 2019

(65) Prior Publication Data

US 2021/0114526 A1 Apr. 22, 2021

(51) Int. Cl.
| | |
|---|---|
| *B60R 7/04* | (2006.01) |
| *B60R 11/00* | (2006.01) |
| *B60N 2/75* | (2018.01) |
| *F16C 1/10* | (2006.01) |
| *B60N 2/02* | (2006.01) |
| *B60R 7/08* | (2006.01) |
| *B60N 3/00* | (2006.01) |

(52) U.S. Cl.
CPC .............. *B60R 7/04* (2013.01); *B60N 2/0232* (2013.01); *B60N 2/773* (2018.02); *B60N 2/793* (2018.02); *B60N 3/00* (2013.01); *B60R 7/08* (2013.01); *F16C 1/106* (2013.01); *B60N 2002/0236* (2013.01); *B60R 2011/0007* (2013.01); *B60R 2011/0084* (2013.01); *B60R 2011/0092* (2013.01)

(58) Field of Classification Search
CPC ..... B60R 2011/0007; B60R 2011/0084; B60R 2011/0092; B60R 7/04; B60N 2/0232; B60N 2/0236; B60N 2/793; B60N 2/067; B60N 2002/036; B60N 2002/024; B60N 3/00
USPC .................. 296/65.13–65.15, 34.34, 37.8
See application file for complete search history.

(56) References Cited

U.S. PATENT DOCUMENTS

| | | | | |
|---|---|---|---|---|
| 5,482,243 A | * | 1/1996 | Minder | B60N 2/0725 248/429 |
| 6,264,261 B1 | * | 7/2001 | Krafcik | B60R 7/04 297/256.16 |
| 8,182,011 B2 | * | 5/2012 | Suzuki | B60P 1/003 296/37.16 |

(Continued)

FOREIGN PATENT DOCUMENTS

CN 109050414 A 12/2018

*Primary Examiner* — Gregory A Blankenship
(74) *Attorney, Agent, or Firm* — Dickinson Wright PLLC (57) ABSTRACT

Center console provided with a fixed rail, extending in a longitudinal direction, a translatable member, a gearbox assembly and first and second cables. The translatable member may be coupled to the fixed rail and configured to move between a first position and a second position. The gearbox assembly may include a cable drum configured to rotate in a first rotational direction and a second rotational direction. The first and second cables may each be coupled to the translatable member and a cable drum. As the cable drum rotates in the first rotational direction, the first cable may translate the translatable member towards the first position. As the cable drum rotates in the second rotational direction, the second cable may translate the translatable member towards the second position.

18 Claims, 6 Drawing Sheets

(56) References Cited

U.S. PATENT DOCUMENTS

| | | | | |
|---|---|---|---|---|
| 2003/0197392 | A1* | 10/2003 | Clark | B60R 7/04 296/24.34 |
| 2003/0234550 | A1* | 12/2003 | Brooks | B60N 2/793 296/24.46 |
| 2004/0164218 | A1* | 8/2004 | Yokota | B60N 2/0887 248/430 |
| 2005/0093328 | A1* | 5/2005 | Moriyama | B60N 2/0747 296/65.15 |
| 2005/0116488 | A1* | 6/2005 | Sakakibara | B60R 7/04 296/37.8 |
| 2008/0290680 | A1* | 11/2008 | Busha | B60N 3/101 296/24.34 |
| 2008/0303302 | A1* | 12/2008 | Sturt | B60R 7/04 296/24.34 |
| 2010/0078954 | A1* | 4/2010 | Liu | B60R 7/04 296/37.8 |
| 2010/0090491 | A1* | 4/2010 | Hipshier | B60R 7/04 296/24.34 |
| 2010/0201147 | A1* | 8/2010 | Jones | B60N 2/777 296/24.34 |
| 2011/0037287 | A1* | 2/2011 | Penner | B60Q 3/229 362/459 |
| 2011/0068598 | A1* | 3/2011 | Penner | E05B 79/20 70/85 |
| 2017/0368964 | A1* | 12/2017 | Kim | B60N 2/06 |
| 2018/0162299 | A1* | 6/2018 | Ranganathan | B60N 3/10 |
| 2018/0334106 | A1* | 11/2018 | Beauregard | B60N 3/10 |
| 2019/0111850 | A1* | 4/2019 | Van | B60R 7/04 |
| 2020/0114785 | A1* | 4/2020 | Hagedorn | B60N 2/14 |
| 2020/0156553 | A1* | 5/2020 | Kang | B60N 2/14 |
| 2021/0114526 | A1* | 4/2021 | Elsarelli | B60N 2/0232 |

\* cited by examiner

CABLE DRIVEN SLIDING CENTER CONSOLE

TECHNICAL FIELD

The present disclosure relates to a center console assembly provided with a moving portion.

BACKGROUND

Larger vehicles, such as sport utility vehicles or vans may include first, second, and third rows of seats within the vehicle cabin. The various rows of seats may be bench seats, one continuous seat, or two individual seats that are spaced apart from one another. Generally, the two seats of the first row or front row are disposed on either side of a center console assembly. A fixed center console between two individual seats in the second row would block ingress to the third row of seats from the vehicle cabin.

Center consoles serve several purposes such as providing storage and housing climate controls and entertainment features.

SUMMARY

According to one embodiment, a center console for use in a vehicle is provided. The center console may include a fixed rail, extending in a longitudinal direction, a translatable member, a gearbox assembly, first and second cables. The translatable member may be coupled to the fixed rail and may be configured to receive a translatable receptacle and translate along the fixed rail to carry the translatable receptacle between the first position that may be spaced apart from the fixed receptacle by a first distance, and a second position that may be spaced apart from the fixed receptacle by a second distance. The second distance may be greater than the first distance. The gearbox assembly may include a cable drum that may be configured to rotate in a first rotational direction and a second rotational direction. The first cable and the second cable may each include first and second ends. The first end of the first cable and the first end of the second cable may each be fixed to the cable drum. The second end of the first cable and the second end of the second cable may each be coupled to the translatable member towards the first position. The cable drum may rotate in a first rotational direction and a second rotational direction. As the cable drum rotates in the first rotational direction, the second cable may translate the translatable member towards the second position.

According to another embodiment, a center console for use in a vehicle is provided. The center console may include a base member, a stanchion, a fixed rail, extending in a longitudinal direction, a translatable member, a gearbox assembly, first and second cables. The base member may be configured to be coupled to a floor of the vehicle. The stanchion may extend from the base member. The fixed rail may be fixed to the stanchion and may be configured to be positioned adjacent to a fixed receptacle. The translatable member may be coupled to the fixed rail and configured to translate along the fixed rail to carry a translatable storage container between a first position and a second position. The gearbox assembly may include a cable drum that may be configured to rotate in a first rotational direction and a second rotational direction. The first cable and the second cable may each include first and second ends. The first end of the first cable and the first end of the second cable may each be fixed to the cable drum. The first cable and the second cable may each include first and second ends. The first end of the first cable and the first end of the second cable may each be fixed to the cable drum. The second end of the first cable and the second end of the second cable may each be coupled to the translatable member towards the first position. The cable drum may rotate in a first rotational direction and a second rotational direction. As the cable drum rotates in the first rotational direction, the second cable may translate the translatable member towards the second position.

According to yet another embodiment, a center console for use in a vehicle is provided. The center console may include a gearbox assembly, a first pair of rails, a second pair of rails, a first cable, a second cable, a third cable, and a fourth cable. The gearbox assembly may include a cable drum configured to rotate in a first rotational direction and a second rotational direction. The first pair of rails may include a first fixed rail, extending in a longitudinal direction, and a first translatable rail that may be coupled to the first fixed rail and configured to translate along the first fixed rail between a first position and a second position. The first cable and the second cable may each include first and second ends. The first end of the cable and the first end of the second cable may each be fixed to the cable drum. The second end of the first cable and the second end of the second cable may each be coupled to the first translatable rail. The second pair of rails may include a second fixed rail, extending in the longitudinal direction, a second translatable rail that may be coupled to the second fixed rail and configured to translate along the second fixed rail between a first position and a second position. The third cable and the fourth cable may each include first and second ends. The first end of the third cable and the first end of the fourth cable may each be fixed to the cable drum. The second end of the third cable and the second end of the fourth cable may each be coupled to the second translatable rail. As the cable drum rotates in the first rotational direction, the first cable may translate the first translatable rail towards the first position and the third cable may translate the second translatable rail towards the first position. As the cable drum rotates in the second direction, the second cable translates the first translatable rail towards the second position and the fourth cable may translate the second translatable rail towards the second position.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

This invention is not limited to the specific embodiments and methods described below, as specific components and/or conditions may, of course, vary. Furthermore, the terminology used herein is used only for the purpose of describing particular embodiments of the present invention and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within ±0%, 0.1%, 0.5%, 1%, 2%, 3%, 4%, 5% or 10% of the value or relative characteristic.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" includes any and all combinations of one or more of the associated listed items.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
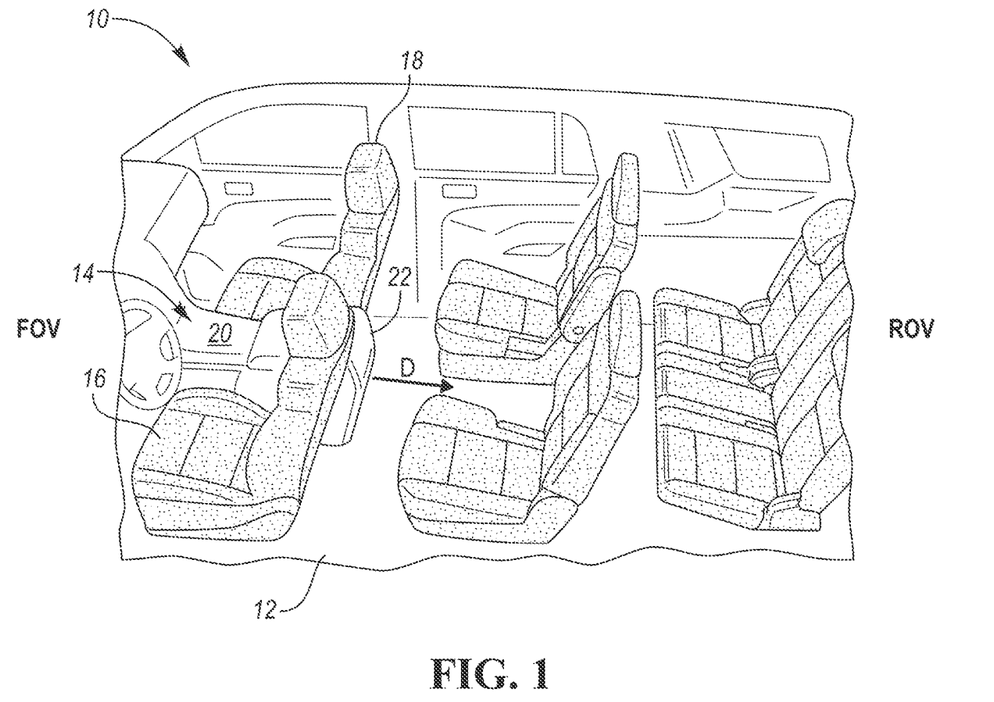
FIG. 1 illustrates a perspective view of an exemplary vehicle interior.

FIG. 1 illustrates a vehicle 10, in particular, a vehicle cabin that includes a vehicle floor 12 and a sliding center console assembly 14 that is attached to the floor 12. The sliding center console 14 includes a fixed portion 20 and a sliding or translating portion 22. In one embodiment, the translating portion 22 of the center console assembly 14 may be coupled to and move along an elongated cavity such as a slot or track formed within the floor 12. Here, sliding center console assembly 14 is disposed in a forward position, between a driver's seat 16 and a passenger seat 18. The translating portion 22 may be configured to move along the directional arrow D.

Referring generally to the figures, the center console 14 according to one or more embodiments is provided. The center console 14 may include a base member 100 that may be coupled to the vehicle floor 12 by one or more fasteners that may extend from the vehicle floor 12 or through the base member. The center console 14 may include a fixed rail 102 that may be fixed to a stanchion 104 and that may extend in a longitudinal direction, extending towards the front of the vehicle (FOV) and the rear of the vehicle (ROV) that may extend from the base member 100. A translatable member 106 may be coupled to the fixed rail 102 and configured to translate along the fixed rail 102, in the longitudinal direction, between a first position and a second position. As one example, the first position may be positioned closer to the front of the vehicle FOV than the second position. And the second position may be positioned closer to the rear of the vehicle ROV than the first position.

The translatable member 106 may be coupled to a gearbox assembly 108 by a first cable 110 and a second cable 112. The gearbox assembly 108 may include a cable drum 114 that may be configured to rotate in a first rotational direction and a second rotational direction. A first end 116 of the first cable 110 and a first end 118 of the second cable 112 may each be coupled to, such as, directly connected to, the cable drum 114. A second end 119 of the first cable 110 and a second end 120 of the second cable 112 may each be coupled to the translatable member 106 so that as the cable drum 114 rotates in the first rotational direction, the translatable member 106 translates towards the first position and as the cable drum 114 rotates in the second rotational direction, the second cable 112 translates the translatable member 106 towards the second position.

As one example, the base member 100, stanchion 104, or the fixed rail 102, or some combination thereof, may each be formed of a plastic or polymeric material, including thermoplastic, thermoset plastics or polymers. As another example, each of these components may be formed of one or more composite materials, such as fiber-reinforced plastics. Fiber-reinforced plastics (also known as fiber-reinforced polymers) are composite materials made of a polymer matrix reinforced with fibers. The fibers may be glass, carbon, basalt, aramid or other appropriate reinforcing materials. The polymer may be an epoxy, vinylester, polyester thermosetting plastic, phenol formaldehyde resin, or other appropriate polymer or plastic. Fiber-reinforced plastics may also be heat and/or pressure cured.

In one or more embodiments, the stanchion 104 and the fixed rail 102 may be integrally formed with one another and the base member 100. Integrally forming the stanchion 104 and the fixed rail 102 to one another may decrease the number of components required and associated costs of producing and assembling the components. Integrally forming the stanchion 104, and the fixed rail 102 to one another, or to the base member 100, or both may be accomplished by injection molding.

As another example, the fixed rail 102 may be releasably secured to the base member 100, or the vehicle floor 12, or both. The fixed rail 102 and the translatable member 106 may each be formed of steel, aluminum, magnesium, alloy, or another suitable metal material.

The fixed rail 102 may have an elongated shape and include a bottom wall 122, a first sidewall 124, and a first lip 126. The bottom wall 122 may be fixed to the base member 100 or the vehicle floor 12, or both. The first sidewall 124 may extend from the bottom wall 122 to the first lip 126. The first lip 126 may include curled portion 128 that may curl towards the bottom wall 122. The translatable member 106 may include a mounting member 130 and a second sidewall 132 extending therefrom to a second lip 134. When the translatable member 106 is assembled to the fixed rail 102, the second lip 134 may be at least partially surrounded by the first lip 126. Alternatively, the lip 126 may surround the second lip 134. The mounting member 130 may include a connection member, such as an aperture 136 or a fastener (not illustrated). The aperture 136 may be configured to engage a portion of a translatable receptacle 138, such as a fastener. As another example, the mounting member 130 may include a threaded stud or a weld nut that may engage the translatable receptacle 138.

The gearbox assembly 108 may include a motor 142 that may be coupled to a shaft 144 that may be provided with a gear, such as a worm gear 146. The worm gear 146 may be include a number of worm teeth 147 that may be configured to engage a plurality of gear teeth 150 of a drive gear 148 provided in the gearbox assembly 108. The drive gear 148 may be coupled, directly or indirectly, to the cable drum 114 so that as the motor 142 rotates, the worm gear 146 rotates the drive gear 148 and the cable drum 114. A number of gear teeth 150 of the drive gear 148 and a number of the worm teeth 147 may be configured to engage each other to form a self-locking condition. The self-locking condition of the gears may prevent inadvertent movement of the translatable member 106 with respect to the fixed rail 102.

In one or more embodiments, the base member 100 may have a planar shape having a first side 152 and a second side 154, portions of which may adjoin the vehicle floor 12. An aperture 156 may be formed in a portion of the base member 100, such as a portion that is disposed between the fixed rails 102. The drive gear 148 may be disposed on the second side 154 of the base member 100 and portions of the cable drum 114 may engage the drive gear 148 and extend through the aperture 156. A drive housing 158 may be provided on the second side 154 of the base member 100 so that the drive gear 148 is disposed within the drive housing 158. A drive shaft 160 may extend through or engage a drive shaft aperture 162 provided in the drive housing 158. The drive shaft 160 may extend through the drive gear 148 and the cable drum 114. A bearing cover 164 may be provided on the first side 152 of the base member 100 so that the cable drum 114 is sandwiched between the drive gear 148 and the bearing cover 164. The drive shaft 160 may include a first portion 166 that may engage a receptacle formed by the bearing cover 164.

As one example, the drive housing 158, or the bearing cover 164, or both may be integrally formed with the base member 100 by injection molding or another suitable process. One skilled in the art would recognize that the drive housing 158 and the bearing cover 164 may each be attached to the base member by one or more fasteners (not illustrated).

The cables, such as the first cable 110 and the second cable 112, may each include a wire 170 and a sheath or cover 172 that may encapsulate or surround at least a portion of the wire 170. The translatable member 106 may include a wire attachment member 174 that may define an aperture 176 that receives a distal end 178 of the wire 170. As one example, the wire attachment member 174 may be disposed between sidewalls 132 of the translatable member 106. As another example, an outer portion of the translatable member 106 may form the aperture 176 that receives the distal end 178 of the wire 170.

In one or more embodiments, the fixed rail 102 may include a cable attachment member, such as a cable clamp 180. The cable clamp 180 may be fixed to the base member 100, or the fixed rail 102, or both. The cable clamp 180 may engage the cover 172 of the cables 110, 112, so that the cover 172 is held stationary as the wire 170 translates with respect to the cover 172. The wire attachment member 174 and the cable clamp 180 may each be positioned relative to one another so that the wire attachment member 174 engages the cable clamp 180 at predetermined positions. For example, one of the cable clamps 180 may be fixed to a front portion 186 of the fixed rail 102 and a rear portion 188 of the fixed rail 102. One or more of the predetermined positions may be a first position or front position, near the front of the vehicle FOV and a second position or rear position towards the rear of the vehicle ROV. As another example, the fixed rail may include a tab or protrusion 182 that may engage the wire attachment member 174 or another portion of the translatable member 106.

Figure 2:
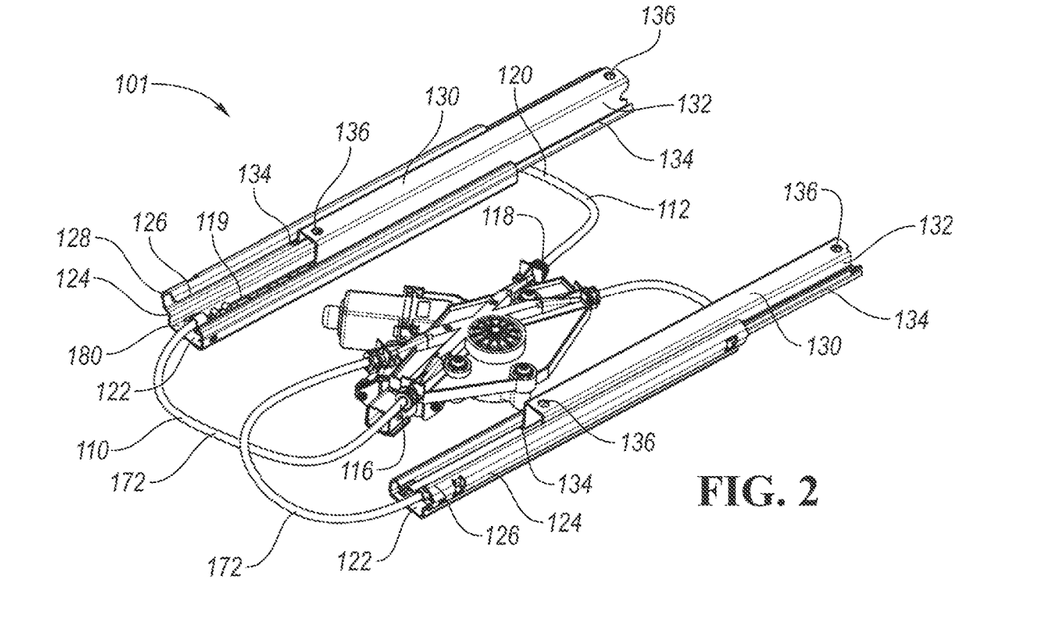
FIG. 2 illustrates a perspective view of an exemplary mechanism for use in a vehicle center console.
Figure 3:
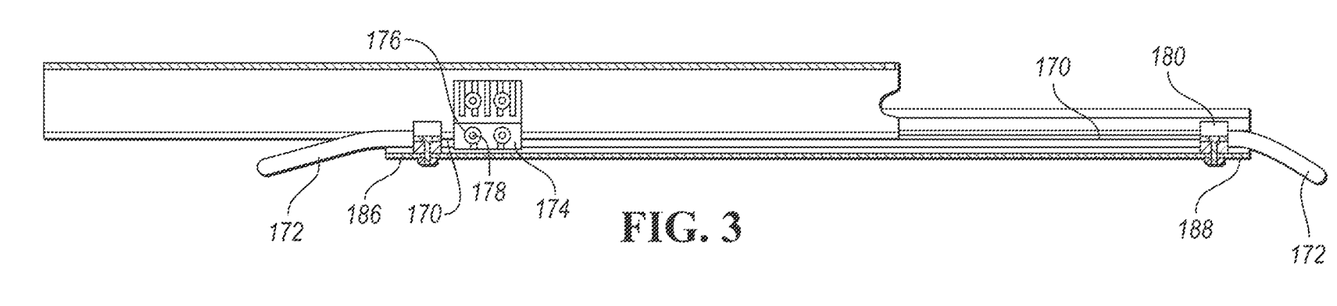
FIG. 3 illustrates a plan-cross-sectional view of the exemplary mechanism provided in FIG. 2.

FIG. 2 illustrates a perspective view of an exemplary mechanism 101 for use in the vehicle center console 14. FIG. 3 illustrates a plan view of the exemplary mechanism 101. The mechanism 101 may include the fixed member 102 and the translatable member 106 that may be coupled to the fixed rail 102 and configured to translate along the fixed rail 102. The fixed rail 102 may include a number of sidewalls such as the first sidewall 124 and the bottom wall 122 extending therefrom. The first lip 126 may extend from the first sidewall 124 and curve towards the bottom wall 122. The translatable member 106 may include the mounting member 130 and the second sidewall 132 that may extend from the mounting member 130. The second lip 134 may extend from the second sidewall 132 towards the mounting member 130. The mounting member 130 may include a connection member, such as an aperture 136. The gearbox assembly 108 may be coupled to the fixed rail 102 and the translatable member 106. For example, the first cable 110 may be operatively disposed between the gearbox assembly 108 and each of the rails 102, 106.

The first cable 110 may include the cover 172 and the wire 170 that may be partially enclosed by the cover 172. The first cable clamp 180 may be fixed to the fixed rail 102 and engage the cover 172 so that the wire 170 may translate with respect to the cover 172. The wire 170 may include the distal end 178 that may engage an aperture 176 formed by the wire attachment member 174. The wire attachment member 174 may be fixed to the translatable member 106.

Figure 4:
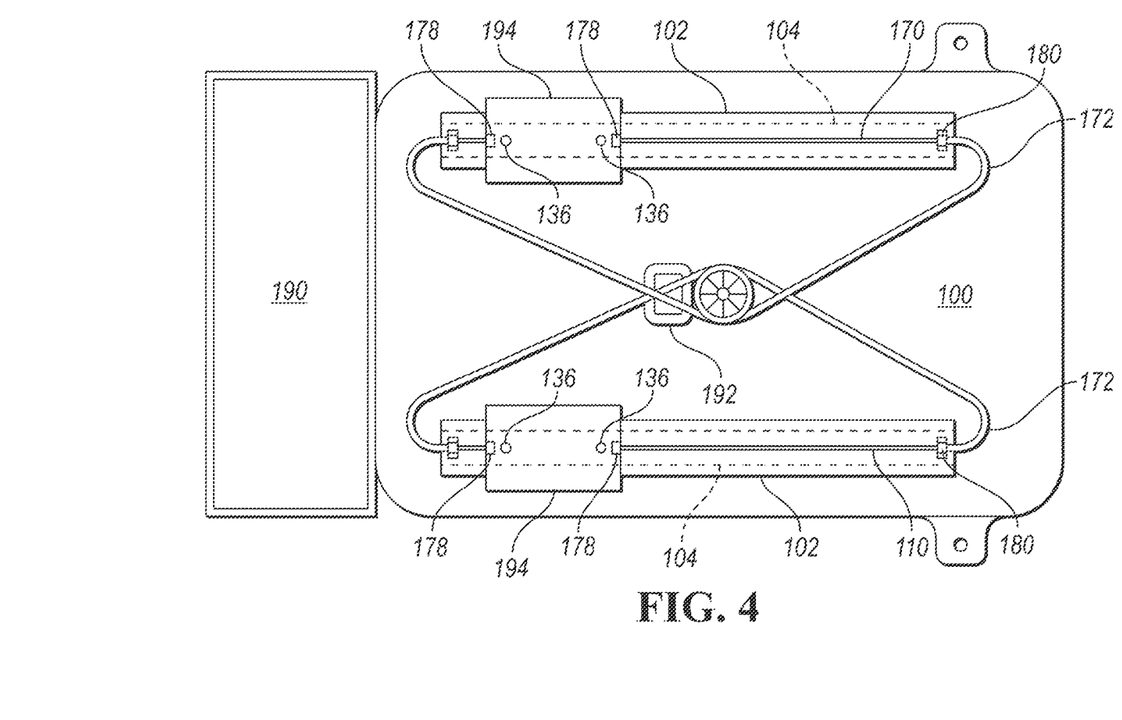
FIG. 4 illustrates a top view of a portion of an exemplary center console.

FIG. 4 illustrates a top view of a portion of the center console assembly 14. The center console assembly 14 may include the base member 100 and one or more fixed rails 102. A fixed receptacle 190 may be fixed to or integrally formed with the base member 100. The fixed rail 102 may include the stanchion 104 that may extend from the base member 100. The base member 100 may include a raised section or receptacle that may form a motor housing 192 that may be configured to receive at least a portion of the motor 142.

Figure 6:
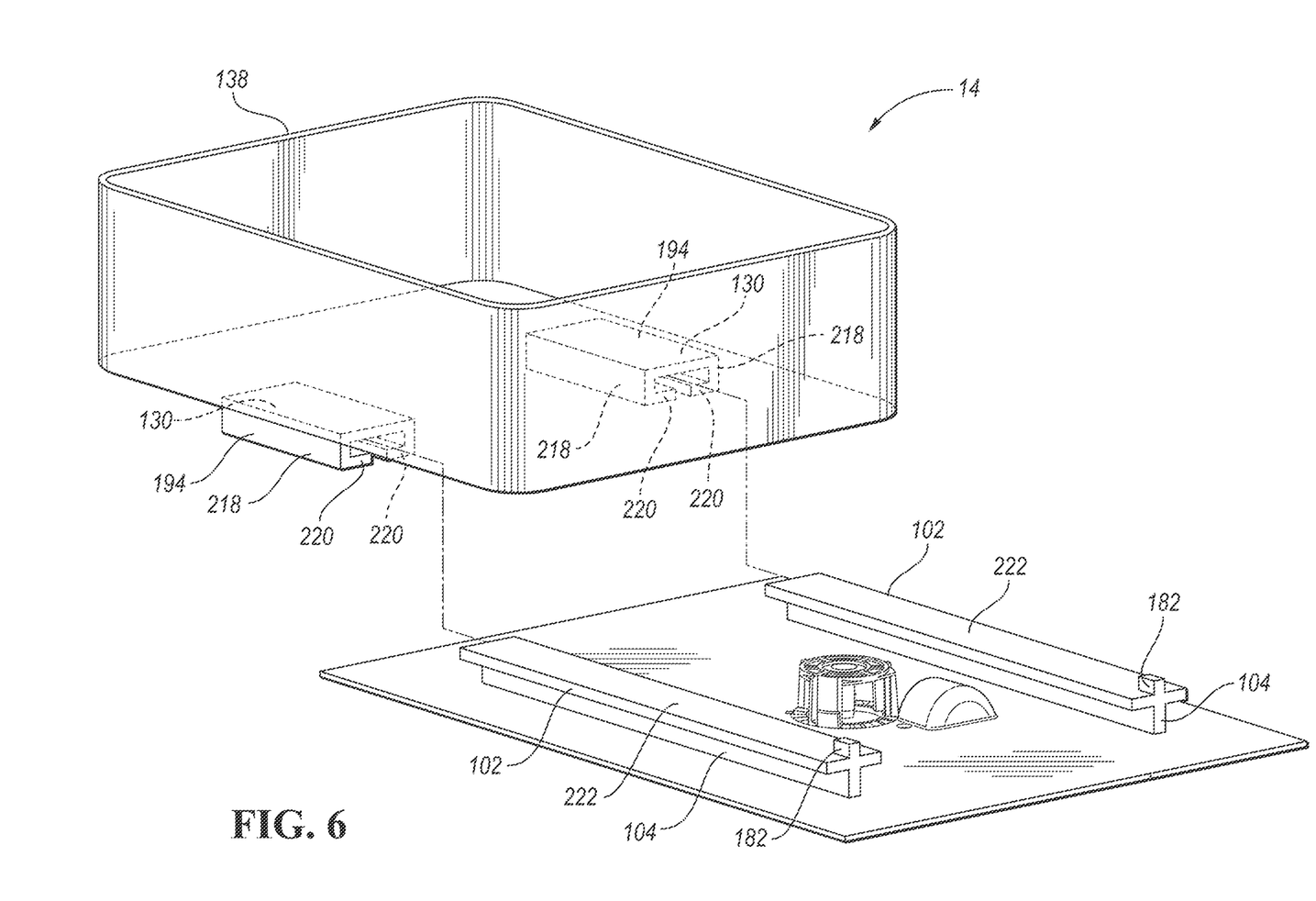
FIG. 6 illustrates an exploded view of a portion of an exemplary center console assembly according to one or more embodiments.

A translatable member or slide 194 may be coupled to the fixed rail 102 and configured to translate along a length the fixed rail 102. The slide 194 may include a mounting member 130 that may receive the translatable receptacle 138 (FIG. 6). The mounting member may have a planar shape and include the connection member such as the aperture 136. The slide may include one or more apertures 176 that may be configured to receive the distal end 178 of the wire 170.

Figure 5:
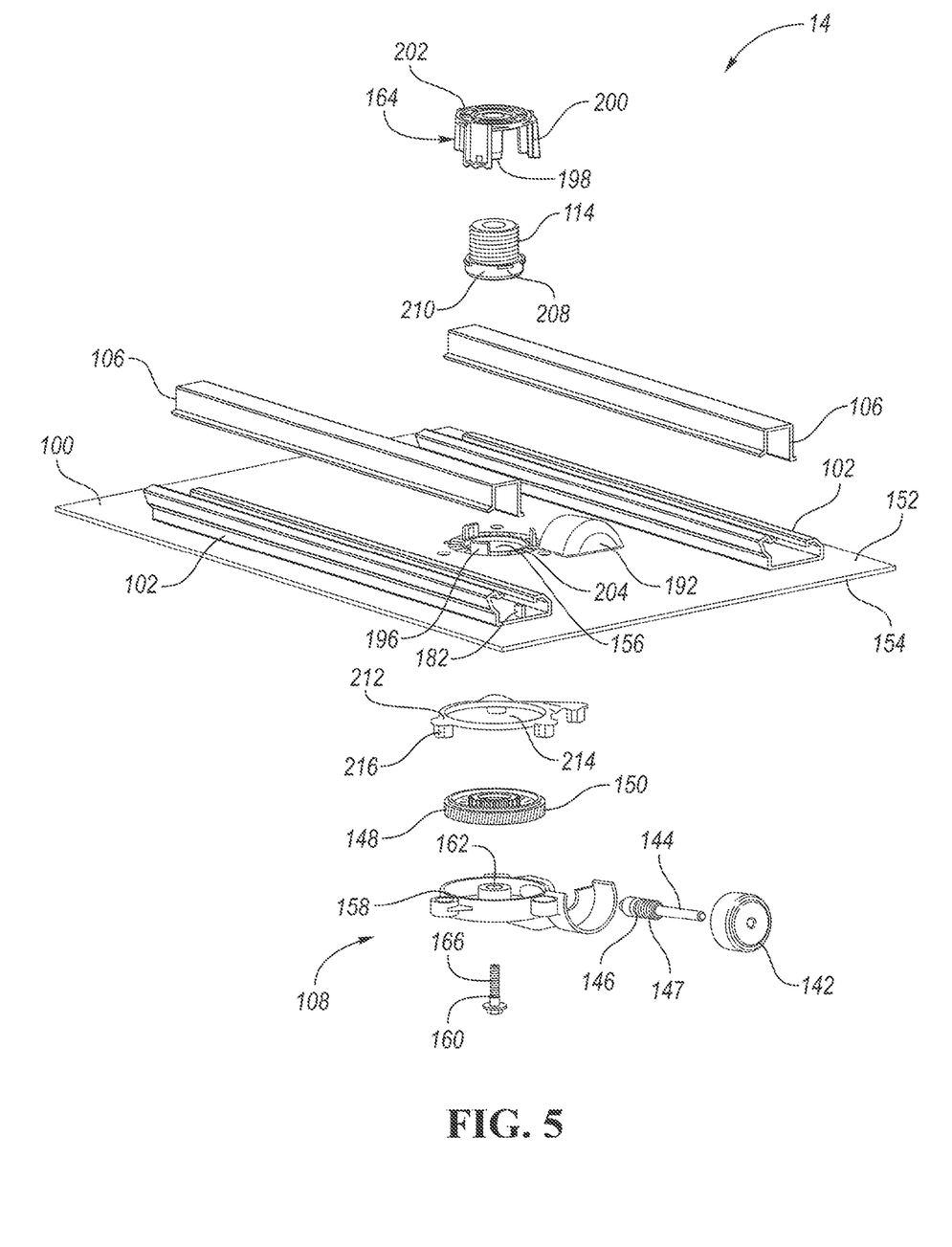
FIG. 5 illustrates an exploded view of a portion of the exemplary center console provided in FIG. 4.

FIG. 5 illustrates an exploded view of a portion of the center console assembly 14. The fixed rail 102 may be coupled to the base member 100 and be configured to receive the translatable rail 106. The aperture 156 may be configured to receive the cable drum 114, a portion of the drive gear 148, or both. The cable drum 114 may include a number of protrusions 208 that may extend radially from a non-threaded portion 210 of the cable drum 114. One or more of the protrusions 208 may be configured to engage the second side 154 of the base member 100. As one example, the protrusions may provide a bearing surface that engages the second side 154 of the base member 100 as the cable drum 114 rotates.

A number of tabs 196 may extend from the first side 152 of the base member 100. Portions of the bearing cover 164 may include apertures that are configured to engage the one or more of the tabs 196. The bearing cover 164 may include a protrusion 198 that forms an aperture that is configured to receive the drive shaft 160. A number of legs 200 may extend from a top portion 202 of the bearing cover 164 that may be configured to engage a number of ribs 204 that may circumferentially surround the aperture 156 of the base member 100.

A housing ring 212 may be disposed between the drive housing 158 and the second side 154 of the base member 100. The housing ring 212 may form an aperture 214 that may surround the drive gear 148. The housing ring 212 may include a number of tabs 216 that may be configured to engage apertures formed in the drive housing 158 to form a force fit condition. As one example, the housing ring 212 may be attached to the drive housing 158 by one or more fasteners. As another example, the housing ring may be integrally formed with the base member 100.

FIG. 6 illustrates an exploded view of a portion of the center console assembly 14. For purposes of clarity, the fixed receptacle 190, the cables 110, and wire attachment member 174 are not illustrated. The translating receptacle 138 is illustrated above and longitudinally offset from the base member 100. One or more slides 194 may extend from the translating receptacle 138. As one example, the one or more slides 194 may be integrally formed with the translating receptacle 138. As another example, the one or more slides 194 may be mechanically connected to the translating receptacle 138.

Each of the slides 194 may include a sidewall 218 that may extend from the mounting member 130 in a direction that is orthogonal to the longitudinal direction. One or more lips 220 may extend from the sidewall 218. The lips 220, mounting member 130, and the sidewall 218 may form a slot that is configured to receive the fixed rail 102. In one or more embodiments, the fixed rail 102 may be T-shaped. The bottom portion of the T-shaped fixed rail 102 may be formed by the stanchion 104 and a wall member 222 may form the upper portion of the T-shaped fixed rail 102.

Figure 7:
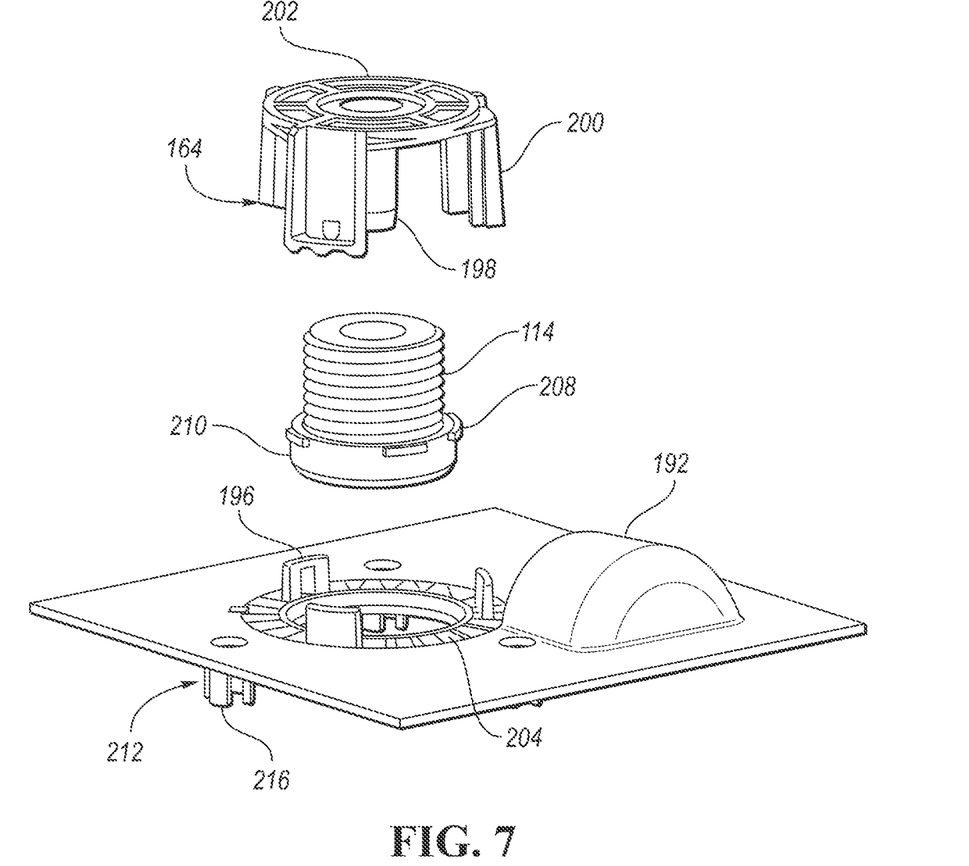
FIG. 7 illustrates a detailed view of a portion of the center console assembly illustrated in FIG. 5.

FIG. 7 illustrates a detailed view of a portion of the center console assembly illustrated in FIG. 5.

Figure 8:
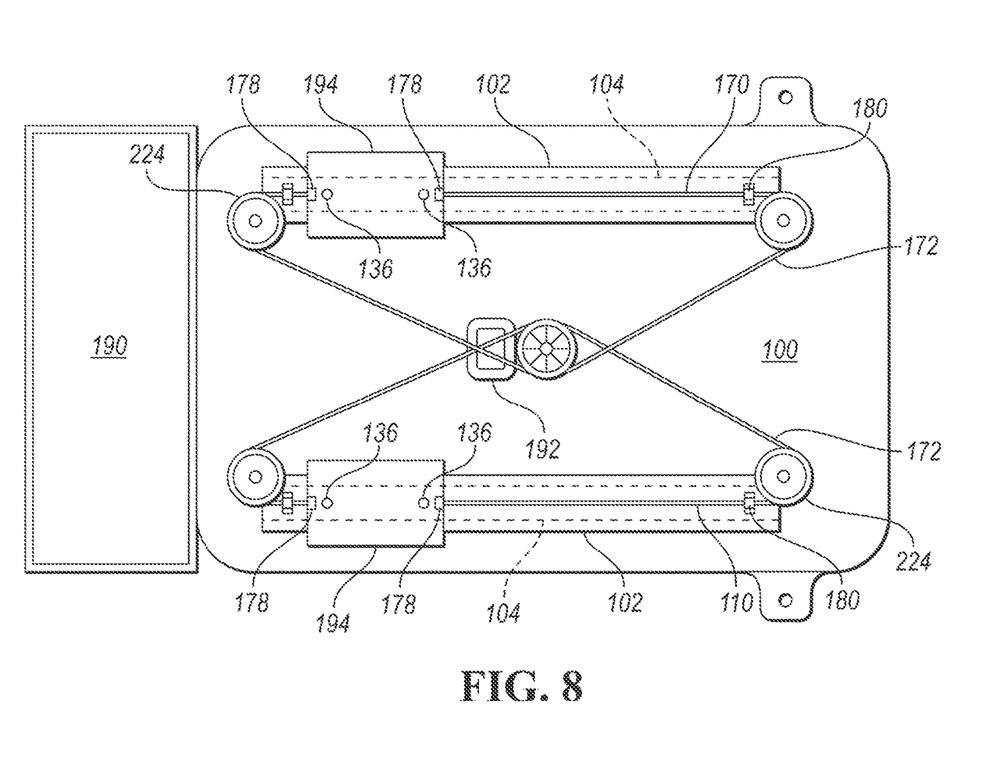
FIG. 8 illustrates a top view of a portion of another exemplary center console.

FIG. 8 illustrates a top view of a portion of the center console assembly 14 according to one or more embodiments. The center console assembly 14 may include one or more redirection members, such as pulleys 224. The pulleys 224 may be pivotally coupled to the base member 100 and engage the cables 110, 112. The pulleys 224 may provide a mechanical advantage to decrease the force required to move the translatable members 194 along the fixed rail 102.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST 10 vehicle
12 vehicle floor
14 center console assembly
18 seat
20 portion
22 portion
100 base member
101 mechanism
102 fixed rails
104 stanchion
106 translatable member
108 gearbox assembly
110 first cable
112 second cable
114 cable drum 116 first end of first cable
118 first end of second cable
119 second end of first cable
120 second end of second cable
122 bottom wall
124 first sidewall
126 lip
128 curled portion
130 mounting member
132 second sidewall
134 second lip
136 aperture
138 translatable receptacle
142 motor
144 shaft
146 worm gear
147 worm teeth
148 drive gear
150 gear teeth
152 first side
154 second side
156 aperture
158 drive housing
160 drive shaft
162 drive shaft aperture
164 bearing cover
166 first portion
170 wire
172 cover
174 wire attachment member
176 aperture
178 distal end
180 first cable clamp
182 protrusion
186 front portion
188 rear portion
190 receptacle
192 motor housing
194 slide
196 tabs
198 protrusion
200 legs
202 top portion
204 ribs
208 protrusions
210 non-threaded portion
212 housing ring
214 aperture
216 number tabs
218 sidewall
220 lips
222 wall member
224 pulley

What is claimed is:

1. A center console for use in a vehicle, the center console comprising:
a fixed rail extending in a longitudinal direction, wherein the fixed rail includes a bottom wall, a first sidewall, extending from the bottom wall, and a first lip curled from the first sidewall towards the bottom wall;
a translatable member coupled to the fixed rail and configured to receive a translatable receptacle and translate along the fixed rail to carry the translatable receptacle between a first position, spaced apart from or adjacent to a fixed receptacle by a first distance, and a second position, spaced apart from the fixed receptacle by a second distance greater than the first, wherein the translatable member includes a mounting member, a second sidewall, extending from the mounting member, and a second lip curled from the second sidewall towards the mounting member, wherein the second lip is at least partially surrounded by the first lip;
a gearbox assembly including a cable drum configured to rotate in a first rotational direction and a second rotational direction;
a first cable and a second cable each including first and second ends, wherein the first end of the first cable and the first end of the second cable are fixed to the cable drum, wherein the second end of the first cable and the second end of the second cable are each coupled to the translatable member, wherein as the cable drum rotates in the first rotational direction, the first cable translates the translatable member towards the first position, and wherein as the cable drum rotates in the second direction, the second cable translates the translatable member towards the second position.

2. The center console of claim 1, wherein the mounting member includes a connection member, wherein the connection member is configured to engage the translatable receptacle.

3. The center console of claim 1, wherein the gearbox assembly includes,
a motor;
a shaft coupled to the motor;
a worm gear extending from the shaft and including a plurality of worm teeth; and
a drive gear including a plurality of gear teeth and coupled to the cable drum, wherein the plurality of gear teeth engage the plurality of worm teeth so that as the motor is rotated the worm gear rotates the drive gear and the cable drum.

4. The center console of claim 3, wherein the plurality of gear teeth engages the plurality of worm teeth form a self-locking condition so that inadvertent movement of the translatable member is inhibited.

5. The center console of claim 3, further comprising:
a base member configured to be coupled to a floor of the vehicle; and
a drive housing extending from a first side of the base member, wherein the drive housing receives the drive gear, and wherein the cable drum extends through the base member so that it is disposed on a second side of the base member, opposite the first.

6. The center console of claim 5, wherein the drive housing is integrally formed with the base member.

7. The center console of claim 6, wherein the base member includes a motor housing extending from either the first side or the second side of the base member, wherein the motor housing receives at least a portion of the motor.

8. The center console of claim 7, wherein the motor housing is integrally formed with the base member.

9. The center console of claim 1, further comprising a wire attachment member fixed to the translatable member, wherein the first and second cables each include a wire and a cover surrounding a portion of the wire, wherein the wire attachment member includes a first aperture and a second aperture, wherein the first aperture receives a distal end of a first wire, and wherein the second aperture receives a distal end of the second wire.

10. The center console of claim 9, wherein the fixed rail includes an end stop tab, wherein the wire attachment member engages the end stop tab when the translatable member is in the second position.

11. The center console of claim 9, further comprising a first cable clamp and a second cable clamp each fixed to the fixed rail, wherein the first cable clamp and the second cable clamp are each configured to fix the cover of the first cable and the cover of the second cable so that the wire of the first cable and the wire of the second cable may each translate with respect to the cover.

12. The center console of claim 11, wherein the fixed rail includes a first end and a second end, wherein the first cable clamp is fixed to the first end of the fixed rail and the second cable clamp is fixed to the second end of the first rail.

13. A center console for use in a vehicle, the center console comprising:
 a base member configured to be coupled to a floor of the vehicle;
 a stanchion extending from the base member;
 a fixed rail fixed to the stanchion, extending in a longitudinal direction and configured to be positioned adjacent to a fixed receptacle, wherein the base member is configured to receive the fixed receptacle;
 a translatable member coupled to the fixed rail and configured to translate along the fixed rail to carry a translatable storage container between a first position and a second position;
 a gearbox assembly including a cable drum configured to rotate in a first rotational direction and a second rotational direction;
 a first cable and a second cable each including first and second ends, wherein the first end of the first cable and the first end of the second cable are fixed to the cable drum, wherein the second end of the first cable and the second end of the second cable are each coupled to the translatable member, wherein as the cable drum rotates in the first rotational direction, the first cable translates the translatable member towards the first position, and wherein as the cable drum rotates in the second rotational direction, the second cable translates the translatable member towards the second position.

14. The center console of claim 13, wherein the stanchion is integrally formed with the base member.

15. The center console of claim 13, wherein the fixed rail is integrally formed with the stanchion.

16. The center console of claim 13, wherein the fixed rail includes a first protrusion and a second protrusion each extending away from the longitudinal direction, wherein the translatable member includes a mounting member and a first L-shaped member and a second L-shaped member extending therefrom, wherein each of the first and second L-shaped members each engage the first and second protrusions, respectively.

17. A center console for use in a vehicle, the center console comprising:
 a gearbox assembly including a cable drum configured to rotate in a first rotational direction and a second rotational direction;
 a first pair of rails including a first fixed rail, extending in a longitudinal direction, and a first translatable rail coupled to the first fixed rail and configured to translate along the first fixed rail between a first position and a second position;
 a first cable and a second cable each including first and second ends, wherein the first end of the first cable and the first end of the second cable are fixed to the cable drum, wherein the second end of the first cable and the second end of the second cable are each coupled to the first translatable rail;
 a second pair of rails including a second fixed rail, extending in the longitudinal direction, and a second translatable rail coupled to the second fixed rail and configured to translate along the second fixed rail between the first position and the second position; and
 a third cable and a fourth cable each including first and second ends, wherein the first end of the third cable and the first end of the fourth cable are fixed to the cable drum, wherein the second end of the third cable and the second end of the fourth cable are each coupled to the second translatable rail, wherein as the cable drum rotates in the first rotational direction, the first cable translates the first translatable rail towards the first position and the third cable translates the second translatable rail towards the first position, and wherein as the cable drum rotates in the second direction, the second cable translates the first translatable rail towards the second position and the fourth cable translates the second translatable rail towards the second position.

18. The center console of claim 17, further comprising:
 a wire attachment member fixed to the first translatable member; and
 a cable attachment member fixed to the first fixed rail, wherein the first and second cables each include a wire and a cover surrounding a portion of the wire, wherein the wire attachment member receives a first end of the first cable and a first end of the second cable, wherein the cable attachment member engages the cover of the first cable and the cover of the second cable so that the wire of the first cable and the wire of the second cable may each translate with respect to the cover, wherein the cable attachment member is fixed to a first end of the fixed rail, so that when the first translatable rail is in the second position, the wire attachment member engages the cable attachment member.

* * * * *